United States Patent
Kottkamp et al.

(10) Patent No.: US 9,241,278 B2
(45) Date of Patent: Jan. 19, 2016

(54) MEASURING INSTRUMENT AND A MEASURING METHOD FOR STATIONARY TESTING OF MOBILE-RADIO RELAY STATIONS

(75) Inventors: Meik Kottkamp, Munich (DE); Andreas Roessler, Keller, TX (US)

(73) Assignee: Rhode & Schwarz GmbH & Co. KG, Munich (DE)

( * ) Notice: Subject to any disclaimer, the term of this patent is extended or adjusted under 35 U.S.C. 154(b) by 931 days.

(21) Appl. No.: 13/505,848

(22) PCT Filed: Oct. 7, 2010

(86) PCT No.: PCT/EP2010/006139
§ 371 (c)(1),
(2), (4) Date: Aug. 13, 2012

(87) PCT Pub. No.: WO2011/054428
PCT Pub. Date: May 12, 2011

(65) Prior Publication Data
US 2012/0302159 A1 Nov. 29, 2012

(30) Foreign Application Priority Data
Nov. 3, 2009 (DE) .......................... 10 2009 051 680

(51) Int. Cl.
*H04W 24/00* (2009.01)
*H04W 24/06* (2009.01)
(Continued)

(52) U.S. Cl.
CPC ........... *H04W 24/06* (2013.01); *H04B 17/0085* (2013.01); *H04B 17/21* (2015.01); *H04B 17/3911* (2015.01); *H04B 17/40* (2015.01)

(58) Field of Classification Search
CPC ............... H04B 17/0085; H04B 17/21; H04B 17/3911; H04B 17/40; H04W 24/06; H04L 12/2697; H04L 43/50; H04L 1/247; H04L 67/322; H04L 67/325; H04M 1/24; H04M 3/34
USPC ............ 455/423, 15, 7, 9, 11.1, 13.1, 16, 17, 455/20, 22, 24, 41.2, 3.05; 370/279, 293, 370/315, 492, 501; 375/211, 213, 214; 398/16; 361/160
See application file for complete search history.

(56) References Cited

U.S. PATENT DOCUMENTS

2004/0242221 A1\* 12/2004 Vincent et al. ................ 455/423
2005/0213965 A1\* 9/2005 Bergmann et al. ............. 398/16

FOREIGN PATENT DOCUMENTS

DE     199 55 503 A1   6/2001
EP     1 300 986 A1    4/2003
(Continued)

OTHER PUBLICATIONS

International Preliminary Report on Patentability for PCT/EP2010/006139 dated Jul. 12, 2012, pp. 1-10.
(Continued)

*Primary Examiner* — Shaima Q Aminzay
(74) *Attorney, Agent, or Firm* — Ditthavong & Steiner, P.C.

(57) ABSTRACT

A measuring instrument for testing mobile-radio relay stations provides at least one first measuring device and a receiver device. The first measuring device generates a first signal and transmits it either directly or via at least one further device to a relay station under test. The receiver device receives from the relay station under test a second signal derived from the first signal. The first measuring device compares the first signal and at least one signal derived from the second signal.

11 Claims, 6 Drawing Sheets

(51) Int. Cl.
*H04B 17/00* (2015.01)
*H04B 17/21* (2015.01)
*H04B 17/391* (2015.01)
*H04B 17/40* (2015.01)

(56) References Cited

FOREIGN PATENT DOCUMENTS

| EP | 1 478 115 | A1 | 11/2004 |
| EP | 1 786 144 | A2 | 5/2007 |
| GB | 2 440 190 | A | 4/2008 |

OTHER PUBLICATIONS

International Search Report for PCT Application No. PCT/EP2010/006139 dated Feb. 2, 2011, pp. 1-2.

\* cited by examiner

MEASURING INSTRUMENT AND A MEASURING METHOD FOR STATIONARY TESTING OF MOBILE-RADIO RELAY STATIONS

CROSS-REFERENCE TO RELATED APPLICATION

The present application is a national phase application of PCT Application No. PCT/EP2010/006139, filed on Oct. 7, 2010, and claims priority to German Application No. DE 10 2009 051 680.8, filed on Nov. 3, 2009, the entire contents of which are herein incorporated by reference.

BACKGROUND OF THE INVENTION

1. Field of the Invention

The invention relates to a measuring instrument for the laboratory testing of converter stations, referred to below as relay stations, and a measuring method for the laboratory testing of relay stations.

2. Discussion of the Background

In contemporary mobile-radio systems, mobile stations are connected directly via a radio link to base stations. In this context, each base station covers a given range. Only mobile stations which are disposed within this range can establish contact with the base station. For example, European Patent Application EP 1 478 115 A1 discloses a communications system in which a plurality of mobile stations are each connected to a single base station. The disadvantage here is that the range of the base stations depends heavily upon their location and the surrounding buildings.

The use of relay stations (converter stations) to increase the range or to improve the reception conditions is also known. In this context, the connection of the mobile station to the base station is not implemented by a direct route. Instead, the mobile station is connected to a relay station which is connected in turn to the base station. For example, the German specification DE 199 55 503 A1 discloses a communications system which uses relay stations to increase the range.

However, no measuring instruments or measuring methods are so far known which allow a testing of the relay stations under defined conditions.

SUMMARY OF THE INVENTION

The invention advantageously provides a measuring instrument and a measuring method for stationary testing of mobile-radio relay stations. The testing of mobile-radio relay stations.

A measuring instrument according to the invention for testing mobile-radio relay stations comprises at least one first measuring device and a receiver device. The first measuring device generates a first signal and transmits it either directly or via at least one further device to a relay station under test. The receiver device receives from the relay station under test a second signal derived from the first signal. The first measuring device compares the first signal and at least one signal derived from the second signal. An accurate testing of the relay station is possible in this manner.

The first measuring device preferably transmits the first signal to a first fading unit. The first fading unit preferably adds to the first signal a fading and/or a noise and/or multipath propagation. It preferably transmits this as a third signal to the relay station. The second signal in this context is preferably derived from the third signal. Accordingly, a very realistic transmission channel between the first measuring device and the relay station is simulated. A particularly accurate testing of the relay station is possible in this manner.

The first fading unit advantageously operates in the baseband range or in the high-frequency range. This allows a flexible selection of the testing technology to be used. A fading unit which operates in the baseband range is more cost favourable, while a fading unit which operates in the high-frequency range allows a more accurate testing of the relay station.

The relay station advantageously transmits a signal derived from the first signal to a second fading unit. The second fading unit preferably adds fading and/or noise and/or a multipath propagation to the signal derived from the first signal. It preferably sends this as a fourth signal to the receiver device. This fourth signal is preferably derived from the second signal. In this manner, a very realistic transmission channel between the relay station and the receiver device is simulated. A further increase in the accuracy of the testing of the relay station is possible in this manner.

The second fading unit advantageously operates in the baseband range or in the high-frequency range. In this manner, a flexible selection of the testing technology to be used is possible. A fading unit which operates in the baseband range is more cost favourable, while a fading unit which operates in the high-frequency range allows a more accurate testing of the relay station.

In this context, the receiver device is preferably a second measuring device or a mobile station. If a second measuring device is used, particularly accurate test results can be achieved. By contrast, if a mobile station is used, the test results correspond in a particularly accurate manner with anticipated results for the real use of the relay station.

The first measuring device and the receiver device are advantageously structured as a combined device. Accordingly, a relay station can be tested with only very small cabling costs.

In comparing the signals, the first measuring device preferably determines the quality and/or the velocity of the signal transmission via the relay station. In this manner, the capability of the relay station can be read out directly.

The first signal here preferably comprises largely payload data. The first measuring device preferably transmits no control information via the relay station. Accordingly, a testing of the relay station is possible in the pure payload-data operating mode.

BRIEF DESCRIPTION OF THE DRAWINGS

The invention is described by way of example on the basis of the drawings in which an advantageous exemplary embodiment of the invention is illustrated. The drawings are as follows.

DETAILED DESCRIPTION OF EXEMPLARY EMBODIMENTS OF THE INVENTION

Figure 3:
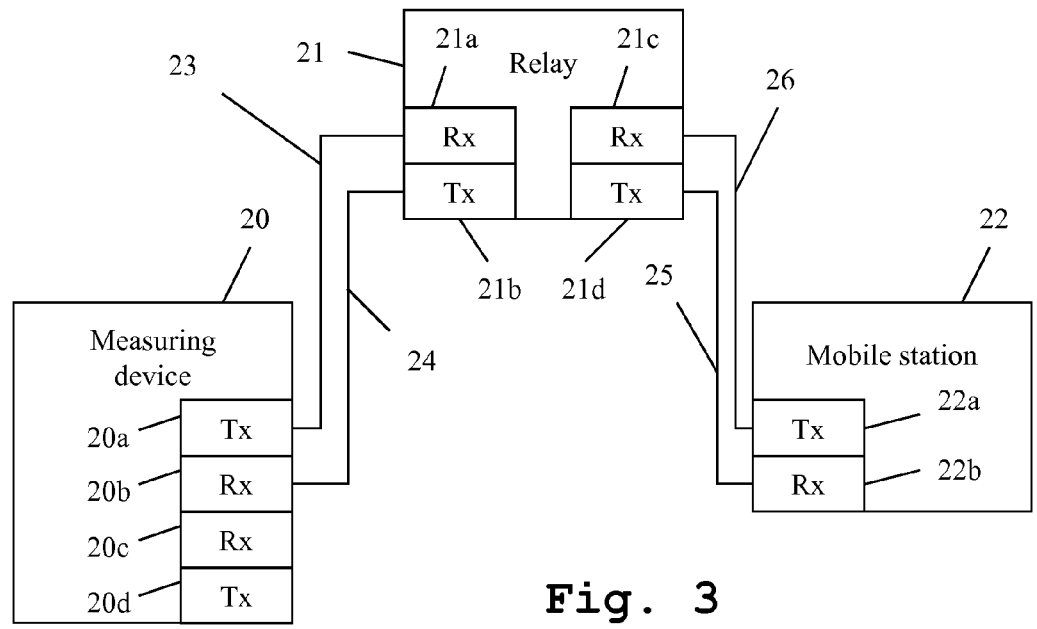
FIG. 3 shows a first exemplary embodiment of the measuring instrument according to the invention.
Figure 4:
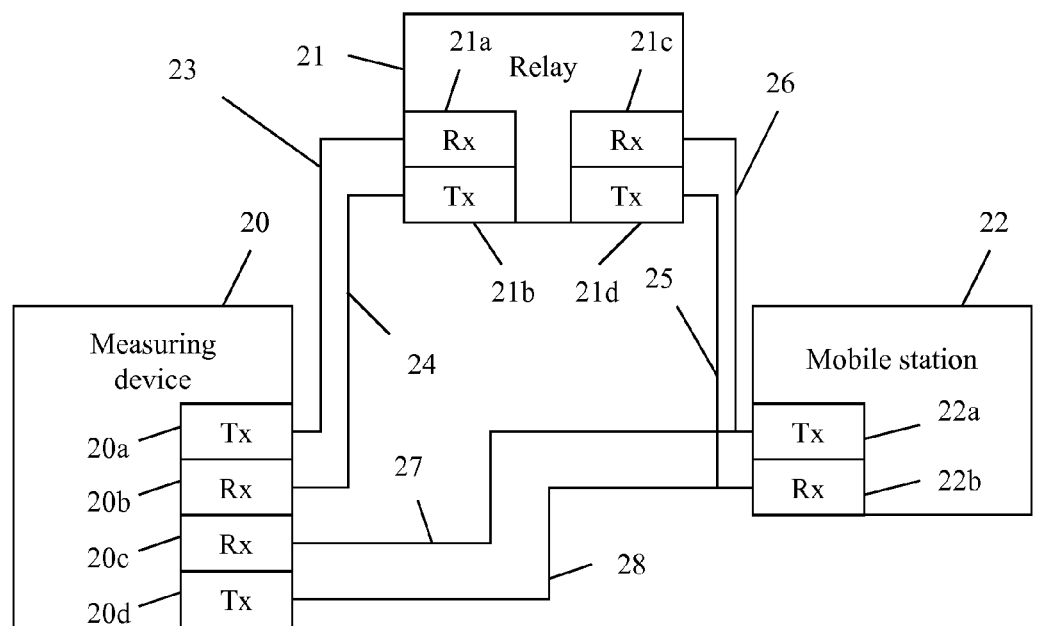
FIG. 4 shows a second exemplary embodiment of the measuring instrument according to the invention.
Figure 5:
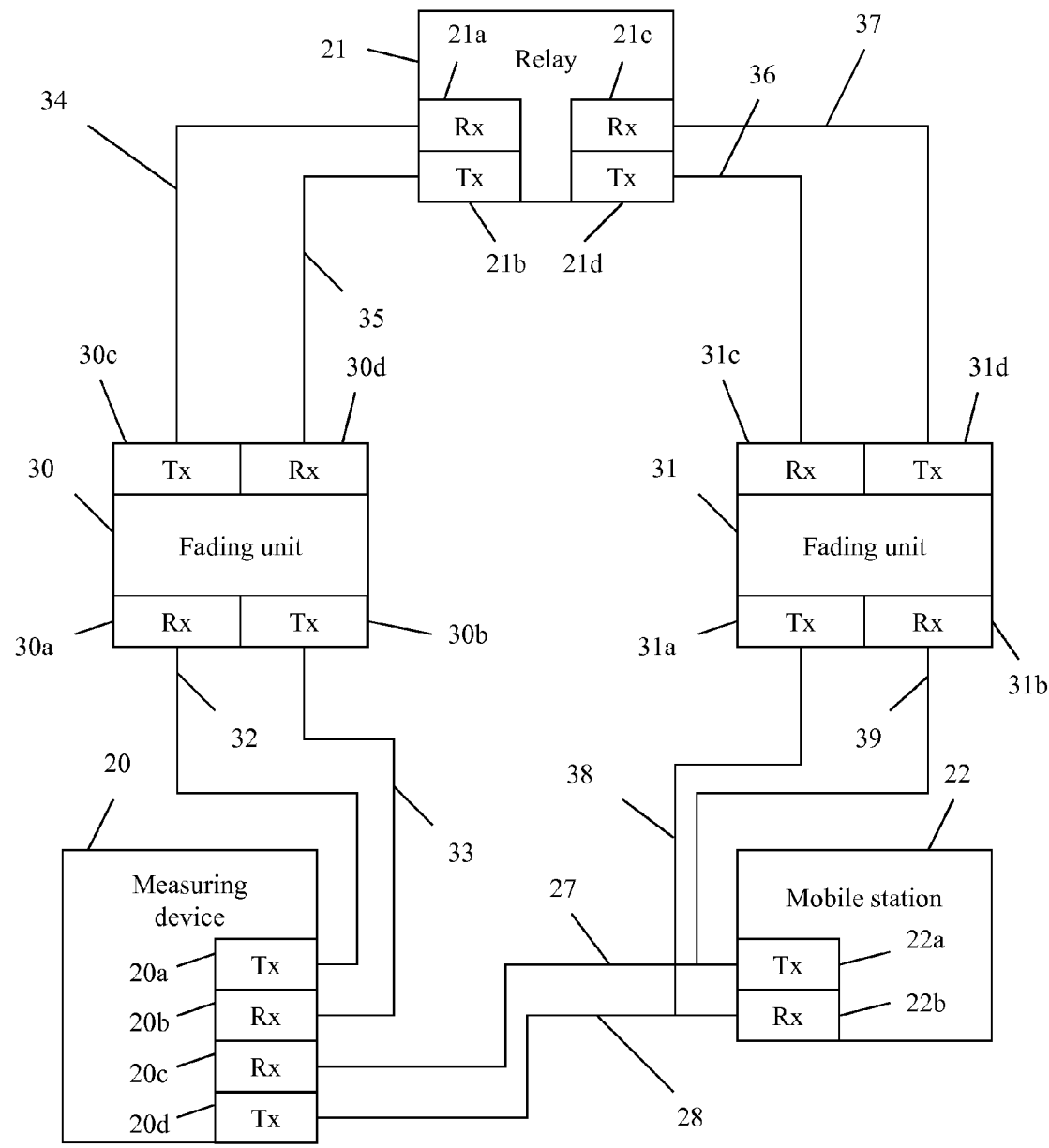
FIG. 5 shows a third exemplary embodiment of the measuring instrument according to the invention.

The structure and functioning of exemplary communications systems is first explained with reference to FIGS. 1-2. With reference to FIGS. 3-5, the structure and functioning of the measuring instrument according to the invention is then shown. Finally, with reference to FIGS. 6-8, the functioning of the measuring method according to the invention is explained. The presentation and description of identical elements in similar drawings has not been repeated in some cases.

Figure 1:
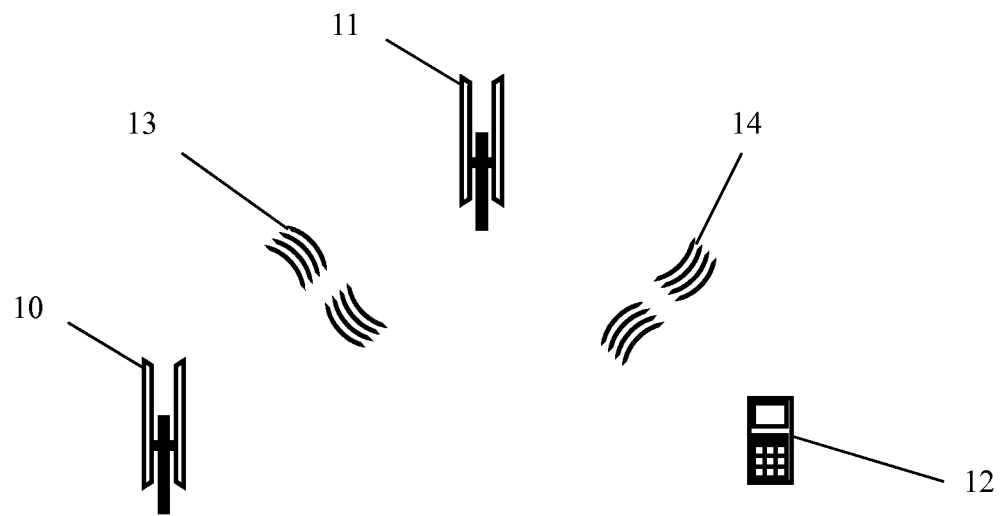
FIG. 1 shows a first exemplary communications system.

FIG. 1 shows a first exemplary communications system. A base station 10 is connected via a transmission channel 13 to a relay station 11. The relay station in 11 is connected via a transmission channel 14 to a mobile station 12. In this context, the mobile station 12 is disposed outside the range of the base station 10, or at least, such poor transmission conditions exist between these two that a transmission is possible only with a loss of quality. Instead, the communication between the base station 10 and the mobile station 12 takes place via the relay station 11.

In this context, all signals of the base station 10 are initially transmitted via the transmission channel 13 to the relay station 11. The relay station 11 converts the signals and transmits them via the transmission channel 14 to the mobile station 12. Signals transmitted in response from the mobile station 12 are transmitted via the transmission channel 14 to the relay station 11, converted by the latter and transmitted via the transmission channel 13 to the base station 10. In this context, the signals contain payload data and also control information which is transmitted jointly via the relay station 11.

Figure 2:
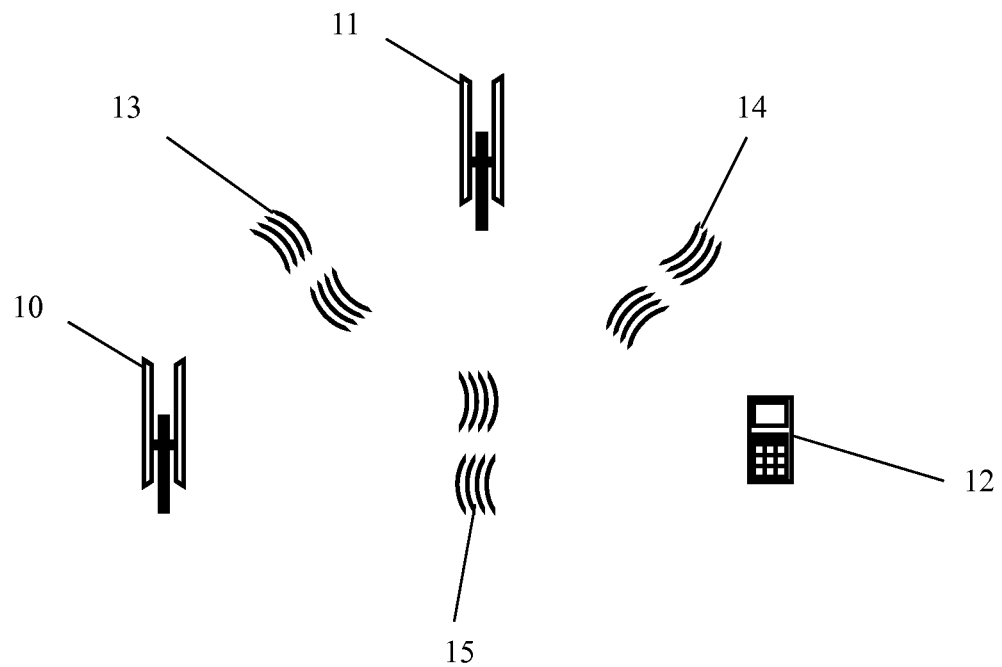
FIG. 2 shows a second exemplary communications system.

FIG. 2 shows a second exemplary communications system. The communications system shown here corresponds largely to the communications system from FIG. 1. However, the base station 10 and the mobile station 12 here are disposed sufficiently close so that a communications channel 15 between the base station 10 and the mobile station 12 also exists and is used. In this context, a separation of the control information and payload data is implemented. The transmission channel 15 between the base station 10 and the mobile station 12 is of significantly poorer quality than the transmission channels 13 and 14 between the base station 10 and the relay station 11 and between the relay station 11 and the mobile station 12.

Accordingly, only control information is exchanged via the transmission channel 15 between the base station 10 and the mobile station 12. The relay station 11 can be relieved of the processing of control information in this manner. Only payload data are communicated from the base station 10 to the mobile station 12 via the transmission channels 13, 14. Accordingly, an improved quality of the signal transmission and therefore a faster data rate can be achieved than when all data are transmitted via the transmission channel 15.

Testing a relay station in the field requires complex test runs. Beyond this, the exact channel conditions are not known. Accordingly, a high-precision testing of the relay station is not possible.

FIG. 3 shows a first exemplary embodiment of the measuring instrument according to the invention. A measuring device 20 is connected via the connecting lines 23, 24 to the relay station 21 under test. Furthermore, the relay station 21 under test is connected via the connecting lines 25, 26 to the receiver device 22. In this context, a mobile station 22 or a measuring device can, for example, be used. In this exemplary embodiment, the receiver device 22 is a mobile station 22. The receiver device 22 is therefore a part of the measuring instrument.

A first transmission unit 20a of the measuring device 20 is connected by means of the connecting line 23 to a first receiver unit 21a of the relay station 21. A first receiver unit 20b of the measuring device 20 in this context is connected by means of the connecting line 24 to a first transmitter unit 21b of the relay station 21. A second receiver unit 21c of the relay station 21 is connected by means of the connecting line 26 to a transmission unit 22a of the receiver device 22. A second transmitter unit 21d of the relay station 21 is connected by means of the connecting line 25 to a receiver unit 22b of the receiver device 22.

The measuring device 20 in this setup simulates a base station which is connected to the relay station 21. The transmitter unit 20a and the receiver unit 20b of the measuring device 20 communicate with the receiver unit 21a and the transmitter unit 21b of the relay station 21. The communication between the measuring device 20 and the relay station 21 accordingly corresponds with the communication between a conventional base station and the relay station 21 under test.

The relay station 21 is also disposed in a communications link with the mobile station 22. The receiver unit 21c and the transmitter unit 21d of the relay station 21 in this context communicate with the transmitter unit 22a and the receiver unit 22b of the receiver device 22. The communication between the relay station 21 and the mobile station 22 accordingly corresponds with a communication of the relay station 21 with a conventional mobile station.

The measuring device 20 establishes a communications link with the mobile station 22 via the relay station 21 under test. Signals are transmitted from the measuring device 20 to the relay station 21. The relay station 21 converts these signals and transmits them to the mobile station 22. The mobile station 22 further transmits signals to the relay station 21, which converts these and transmits them to the measuring device 20. The measuring device 20 and the mobile station 22 register transmitted and received signals in this context. The measuring device 20 and the mobile station 22 are further connected to one another via a connection not illustrated here. The signals registered by the mobile station 22 are transmitted by this means to the measuring device 20. The measuring device 20 compares the signals it has itself registered and the signals registered by the mobile station and determines from these at least one parameter which indicates the capability of the relay station 21. A determination of several such parameters is also possible.

As an option, the first measuring device and the mobile station or the second measuring device can be replaced by a common measuring device which fulfils the functions of the first measuring device and the mobile station or the second measuring device. The relay station 21 is then only connected to this one measuring device.

The exemplary embodiment of the measuring device according to the invention shown in FIG. 3 corresponds to the communication system from FIG. 1. FIG. 4 shows a second exemplary embodiment of the measuring instrument according to the invention. This second exemplary embodiment corresponds to the communications system from FIG. 2. The measuring instrument from FIG. 4 corresponds largely to the measuring instrument from FIG. 3. In FIG. 4, the measuring device 20 is further connected by means of connecting lines 27, 28 to the mobile station 22. A second receiver unit 20c and a second transmitter unit 20d of the measuring device 20 are disposed in this context in a communications link with the transmission unit 22a and the receiver unit 22b of the mobile station 22. A use of second transmitter and receiver units in the receiver device 22 is also possible here. That is to say, the second transmitter and receiver units 20c, 20d of the measuring device 20 are then connected by means of the connecting lines 27, 28 to the second transmitter and receiver units of the receiver device 22, which is not illustrated here. The receiver device 22 here is also a mobile station 22. As an alternative, a second measuring device could be used in this context.

Here also, the measuring device 20 takes on the role of a base station. The measuring device 20 is disposed in a communications link with the relay station 21. The relay station 21 in turn is disposed in a communications link with the mobile station 22. Only payload data are transmitted via the communications link of the measuring device 20 to the relay station 21 and from the relay station 21 to the mobile station 22. Control information is transmitted directly between the measuring device 20 and the mobile station 22. With this setup, the relay station 21 can be tested with regard to a pure transmission of payload data. A determination of the data throughput (throughput measurement) of the relay station 21 is possible in this case.

As an option, as already described with reference to FIG. 3, the first measuring device and the mobile station or the second measuring device can be replaced with a common measuring device which fulfils the functions of the first measuring device and the mobile station or the second measuring device. The relay station 21 is then only connected to this measuring device. The connection between the first measuring device and the mobile station 22 is then dispensed with. The signals are transmitted only within the common measuring device.

FIG. 5 shows a third exemplary embodiment of the measuring device according to the invention. The structure corresponds in part to the structure from FIG. 3 and FIG. 4. If the measuring device 20 and the receiver device 22 are connected directly to the relay station 21, as illustrated in FIG. 3 and FIG. 4, ideal transmission conditions are present. However, the test results obtained in this manner do not correspond with measured values obtained in real operation.

In order to guarantee an increased compatibility of the measured values determined in the laboratory with measured values to be expected in real operation, a fading unit 30 is connected between the measuring device 20 and the relay station 21. The fading unit 30 in this context provides a first receiver unit 30a, a first transmitter unit 30b, a second transmitter unit 30c and a second receiver unit 30d.

The first transmitter unit 20a of the measuring device 20 is connected by means of connecting line 32 to the first receiver unit 30a of the fading unit 30. The first receiver unit 20b of the measuring device 20 is connected by means of the connecting line 33 to the first transmitter unit 30b of the fading unit 30. The second transmitter unit 30c of the fading unit 30 is connected by means of connecting line 34 to the first receiver unit 21a of the relay station 21. The second receiver unit 30d of the fading unit 30 is connected by means of the connecting line 35 to the first transmitter unit 21b of the relay station 21.

The fading unit 30 in this context simulates real transmission conditions on a transmission channel as illustrated in FIG. 1 and FIG. 2. The fading unit 30 adds fading (variable signal fading) and/or noise and/or a multipath propagation to the signal. A simulation of further parameters of a conventional transmission channel by the fading unit 30 is possible.

The transmission from the relay station 21 to the receiver device 22 is also provided with a fading unit 31. In this exemplary embodiment, the receiver device 22 is also a mobile station 22. As an alternative, a second measuring device could also be used here. The fading unit 31 in this context provides a first transmitter unit 31a, a first receiver unit 31b, a second receiver unit 31c and a second transmitter unit 31d.

The second receiver unit 21c of the relay station 21 is connected by means of the connecting line 37 to the second transmitter unit 31d of the fading unit 31. The second transmitter unit 21d of the relay station 21 is connected by means of a connecting line 36 to the second receiver unit 31c of the fading unit 31. The first transmitter unit 31a of the fading unit 31 is connected by means of the transmission line 38 to the receiver unit 22b of the mobile station 22. The first receiver unit 31b of the fading unit 31 is connected by means of the transmission line 39 to the first transmitter unit 22a of the mobile station 22.

The function of the fading unit 31 in this context corresponds to the function of the fading unit 30. The fading unit 31 also simulates real transmission conditions between the relay station 21 and the mobile station 22.

Optionally, only one fading unit 30, 31 may also be used. In this case, only the capability of the relay station 21 to deal with real channel conditions on the transmission channel in which the fading unit 30, 31 is used is tested.

The fading units 30, 31 conventionally operate in the high-frequency range. That is, the measuring device 20 and the receiver device 22 generate transmission signals such as would be supplied to an antenna. These transmission signals are supplied to the fading units 30, 31 and processed by these. However, a fading unit which operates in the high-frequency range is very complex and costly. Fading units which operate in the baseband range can be used as an alternative to fading units which operate in the high-frequency range.

In this case, the fading units 30, 31 in each transmitter unit 30b, 30c, 31a, 31d contain a modulation unit, and in each receiver unit 30a, 30d, 31b, 31c a demodulation unit. The demodulation units demodulate the received signals and transform them into the baseband. The modulation units modulate the signals and generate high-frequency signals. The use of a fading unit which operates in the high-frequency range and a fading unit which operates in the baseband range in a common testing arrangement is also possible. A fading unit which operates in the baseband range can be realised, for example, through the use of a high-frequency measuring device and a signal generator. In this context, the signal generator implements the actual fading and the modulation, while the high-frequency measuring device implements the demodulation.

As an option, an additional fading unit can be used between the measuring device 20 and the receiver device 22. In this case, the capability of the relay station 21 to maintain a connection in the case of disturbed control information is tested.

The first measuring device compares the signals it has transmitted itself with signals received from the mobile station 22 or the second measuring device, as shown in FIG. 3. In this context, it implements a synchronization of the signals. This synchronization takes place, for example, on the basis of frame numbers which are transmitted as a part of the signals. A synchronization by means of a correlation is also possible. After the mutually corresponding portions of the signals have been determined in this manner, the first measuring device compares them with one another. From the comparison, the first measuring device determines at least one parameter, which indicates the quality or capability of the tested relay station 21. Optionally, the first measuring device displays this at least one parameter, for example, the reception field strength and/or the bit-error rate and/or the block-error rate and/or the signal/noise ratio on a display device. The steps described here can be implemented in all of the exemplary embodiments presented.

Alongside the exact comparison of the signals, the determination of data throughput (throughput measurement) is possible under given transmission conditions as a further test option. For this purpose, the fading units initially adjust given transmission conditions. Communication is then implemented as described before via the relay station 21. After the completion of the communication, the first measuring device evaluates the level of the throughput during the communication. In this context, a distinction with regard to the transmission direction is possible. A repetition of the measurement for several different transmission conditions is also conceivable. A measurement of this kind can also be implemented with the exemplary embodiments according to the invention as shown in FIG. 3 and FIG. 4. In this case, the simulation of the transmission conditions is dispensed with. A measurement of the data throughput under ideal conditions is implemented.

As an option, as already described with reference to FIG. 3 and FIG. 4, the first measuring device and the receiver device can be replaced by a common measuring device which fulfils the functions of the first measuring device and the mobile station or the second measuring device. The relay station 21 is then connected to this one measuring device only by means of the fading units 30, 31.

The fading units 30, 31 can also optionally be integrated in this common measuring device. That is, the relay station under test is connected only to a common measuring device.

Figure 6:
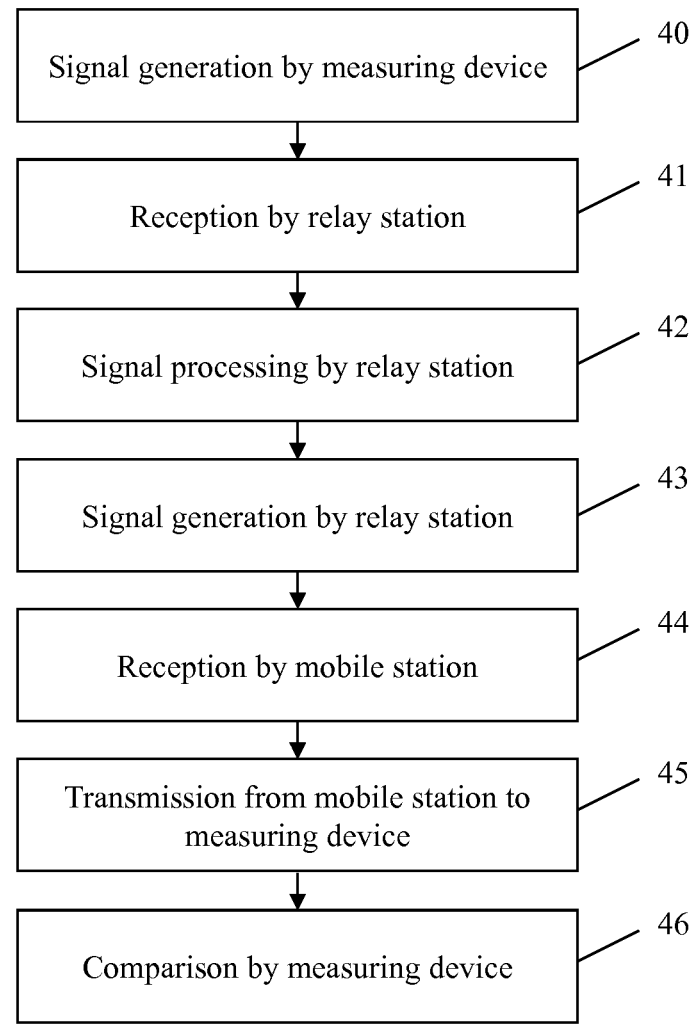
FIG. 6 shows a first exemplary embodiment of the measuring method according to the invention.

FIG. 6 shows a first exemplary embodiment of the measuring method according to the invention. In a first step 40, a high-frequency signal is generated by a measuring device and transmitted to the relay station under test. In a second step 41, the signal transmitted from the measuring device is received by the relay station. In a third step 43 the received signal is processed by the relay station. Dependent upon the type of relay station, only a frequency conversion or more complex processing steps, such as a demodulation and re-modulation are implemented. In a fourth step 43, the relay station, for its part, generates a transmission signal from the received, processed signal and transmits it to a receiver device, for example, a second measuring device or a mobile station.

In a fifth step 44, the signal transmitted from the relay station is received by the second measuring device or the mobile station. In a sixth step 45, the signal received by the second measuring device or the mobile station is transmitted to the first measuring device. In a seventh step 46, the first measuring device compares the signal it has transmitted itself with the signal received by the second measuring device or the mobile station. In this context, at least one parameter is determined which indicates the quality of the signal conversion by the relay station. A determination of several such parameters is also possible. A determination of a data throughput achieved is also possible here. In an optional eighth step, which is not illustrated here, the at least one parameter obtained in this manner is displayed.

For a complete testing of the relay station, a measurement can then optionally be implemented in the reverse transmission direction. That is, the second measuring device or the mobile station transmits a signal to the relay station, which converts the signal and transmits it to the first measuring device. Here also, the first measuring device compares the signal transmitted by the second measuring device or the mobile station with the signal it has received itself.

Figure 7:
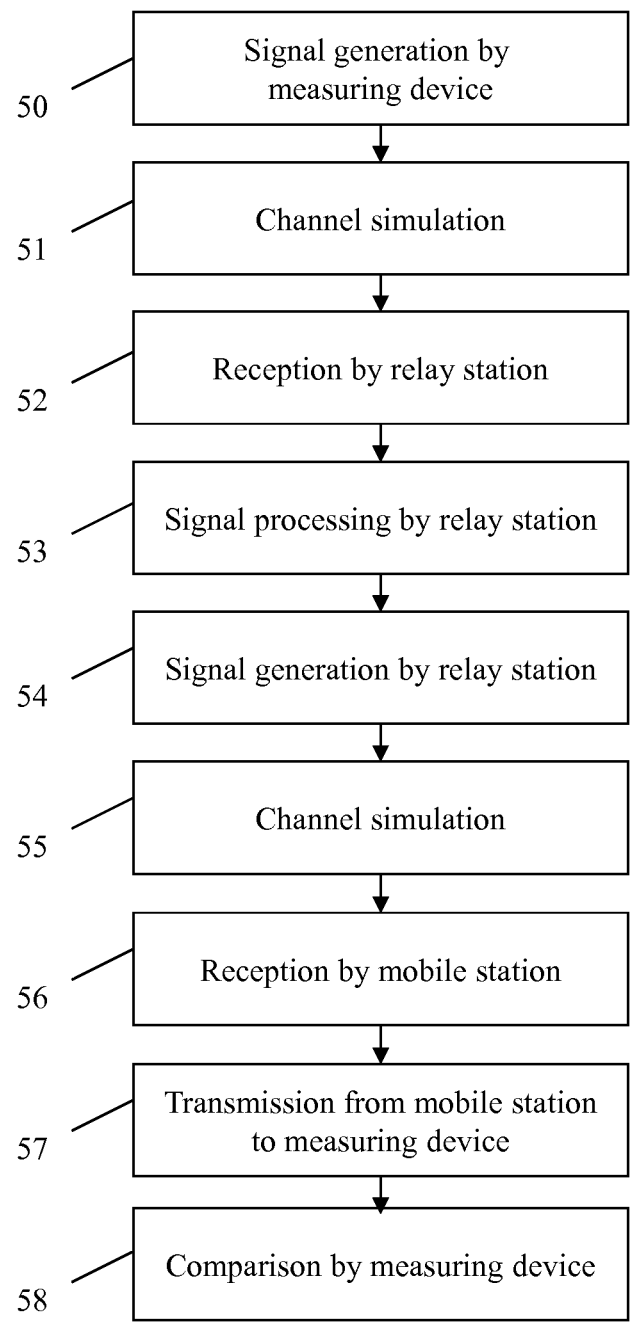
FIG. 7 shows a second exemplary embodiment of the measuring method according to the invention.

FIG. 7 shows a second exemplary embodiment of the measuring method according to the invention. In a first step 50, a high-frequency signal is generated and transmitted by a first measuring device. In a second step 51, a channel simulation takes place. That is, the signal transmitted by the first measuring device is manipulated in such a manner that it appears as if it had been transmitted via a real transmission channel. That is to say, noise and/or fading are added to the signal generated by the first measuring device. An addition of a multipath propagation or other modifications is also possible.

In a third step 52, this modified signal is received by the relay station under test. In a fourth step 53, the received signal is processed by the relay station. This step corresponds to step 42 from FIG. 6. In a fifth step 54, a signal is again generated and transmitted by the relay station. This signal is derived from the signal received by the relay station. In a sixth step 55, another channel simulation is implemented. That is, the signal transmitted from the relay station is modified in such a manner that it appears as if it had been transmitted via a real transmission channel. That is to say, noise and/or fading and/or a multipath propagation are also added to this signal.

In a seventh step 56, this modified signal is received by a receiver device, for example, a second measuring device or a mobile station. In an eighth step 57, the received signal is transmitted by the receiver device to the first measuring device. In a ninth step 58, a comparison of the signal transmitted by the first measuring device and the signal received by the first measuring device takes place. This step corresponds to step 46 from FIG. 6.

The steps 51 and 55 here are optional. Accordingly, it is possible to implement only one channel simulation, that is, step 51 or step 55. As already described with reference to FIG. 6, a reversal of the signal direction is then optionally also possible.

Figure 8:
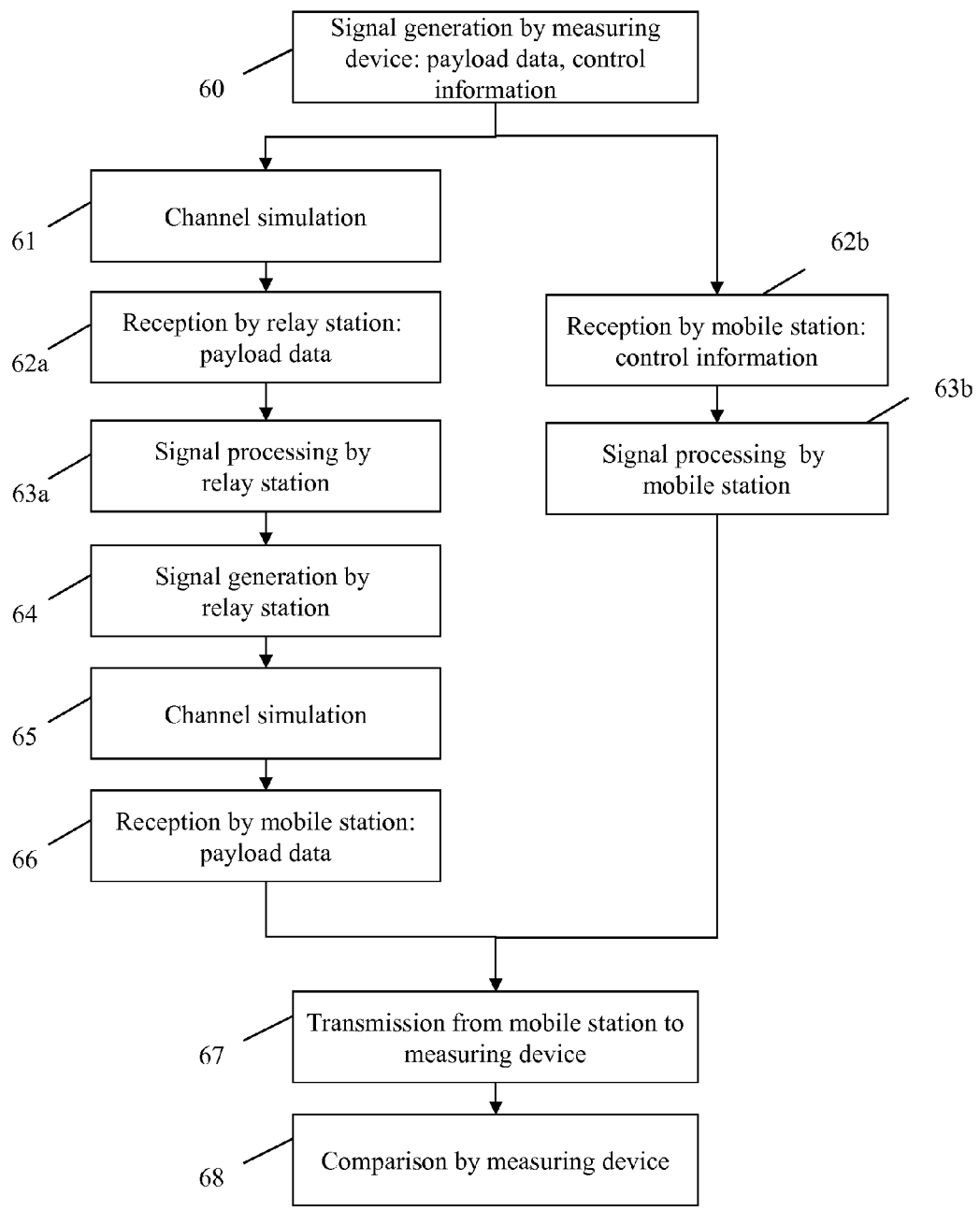
FIG. 8 shows a third exemplary embodiment of the measuring method according to the invention.

FIG. 8 shows a third exemplary embodiment of the measuring method according to the invention. In a first step 60 a first measuring device generates a high-frequency signal. This signal comprises payload data and control information. The signal is transmitted by the measuring device. The control information in this context is supplied to a second measuring device or a mobile station.

The payload data are subjected to a channel simulation in a second step 61. Accordingly, the payload data are modified in such a manner that they appear as if they had been transmitted via a real transmission channel. Noise and/or fading and/or a multipath propagation are added to the signal. An addition of further modifications is also possible.

In a third step 62a, the payload data are received by the relay station under test. At the same time, the control information is received in a fourth step 62b by the mobile station or the second measuring device. In a fifth step 63a, the relay station implements a processing of the received data. This step corresponds to step 42 from FIG. 6. At the same time, the mobile station or the second measuring device implements a processing of the received control information in a sixth step 63b.

In a seventh step 64, the relay station under test generates a signal to be transmitted starting from the processed received signal and transmits this. In an eighth step 65, another channel simulation is implemented on this signal. That is, noise and/or fading and/or multipath propagation and/or other modifications are added to the signal generated by the relay station. In a ninth step 66, this signal is received by a receiver device, for example, a mobile station or a second measuring device.

In a tenth step 67, the second measuring device or the mobile station transmits the payload data which have been received from the relay station and the control information which has been received from the first measuring device back to the first measuring device. In an eleventh step 68, the first measuring device then implements a comparison of the signals it has transmitted itself and the signals received from the second measuring device or the mobile station. This step corresponds to step 46 from FIG. 6.

In this context, a synchronization of the signals is implemented. This synchronization is implemented, for example, with reference to frame numbers which are transmitted as a part of the signals. A synchronization by means of a correlation is also possible. After the mutually corresponding portions of the signals have been determined, the signals are compared with one another. From the comparison, the first measuring device determines at least one parameter which indicates the quality or capability of the relay station tested. This at least one parameter is optionally displayed. The steps described here are conceivable in all of the exemplary embodiments of the measuring method according to the invention presented.

As an additional option, a measurement with reversed signal direction can also be added here. That is, the receiver device generates a signal comprising payload data and control information and transmits it in the same manner to the relay station, which transmits it to the first measuring device. The comparison of the signals here is also implemented in the first measuring device.

As an additional option, a channel simulation between steps 60 and 62b can be used. The capability of the relay station to operate correctly with disturbed control information can be checked through the addition of this channel simulation.

The invention is not restricted to the exemplary embodiment presented. As already mentioned, different communications systems which use relay stations can be used. A use with relay stations of different functionality is possible. A more accurate channel simulation is also possible. In this case, additional modifications are implemented on the transmitted signals. All of the features described above or shown in the drawings can be advantageously combined with one another as required within the scope of the invention.

The invention claimed is:

1. A measuring instrument for testing relay stations, which serve an increase in range or an improvement of the reception conditions in mobile-radio systems, with at least one first measuring device and a receiver device,
    wherein the first measuring device is set up for generating and transmitting a first signal at least indirectly to a relay station,
    wherein the receiver device is set up for receiving from the relay station a second signal derived from the first signal,
    wherein the first measuring device is set up for synchronizing and comparing the first signal and at least one signal derived from the second signal,
    wherein in comparing the signals, the first measuring device determines the quality and/or the velocity of the signal transmission via the relay station under test,
    wherein the measuring instrument further comprises a first fading unit,
    wherein the first measuring device transmits the first signal to the first fading unit,
    wherein the first fading unit is set up for adding fading and/or multipath propagation to the first signal and for transmitting it to the relay station as a third signal, and
    wherein the second signal is derived from the third signal.

2. The measuring instrument according to claim 1, wherein the first fading device operates in the baseband range or in the high-frequency range.

3. The measuring instrument according to claim 1,
    wherein the measuring instrument further comprises a second fading unit,
    wherein the relay station is set up for transmitting the second signal to the second fading unit,
    wherein the second fading unit is set up for adding fading and/or noise and/or multipath propagation to the second signal and for transmitting it to the receiver device as a fourth signal, and
    wherein the fourth signal is derived from the second signal.

4. The measuring instrument according to claim 1,
    wherein the measuring instrument further comprises a second fading unit,
    wherein the relay station is set up for transmitting the second signal to the second fading unit,
    wherein the second fading unit is set up for adding fading and/or noise and/or multipath propagation to the second signal and for transmitting it to the receiver device as a fourth signal, and
    wherein the fourth signal is derived from the second signal.

5. The measuring instrument according to claim 1, wherein the receiver device is a second measuring device or a mobile station.

6. The measuring instrument according to claim 1, wherein the receiver device is a second measuring device or a mobile station.

7. The measuring instrument according to claim 1, wherein the first measuring device and the receiver device are integrated in a common device.

8. The measuring instrument according to claim 1,
    wherein the first signal comprises largely payload data, and
    wherein the first measuring device is set up for transmitting no control information via the relay station.

9. A measuring method for testing relay stations, which serve an increase in range or an improvement of the reception conditions in mobile-radio systems,
    wherein a first signal is generated and transmitted at least indirectly to a relay station,
    wherein a second signal derived from the first signal is received,
    wherein the first signal and at least one signal derived from the second signal are synchronized and compared,
    wherein in comparing the signals, the quality and/or the velocity of the signal transmission via the relay station under test is determined,
    wherein fading and/or multipath propagation is added to the first signal to generate a modified first signal,
    wherein the modified first signal is transmitted to the relay station under test as a third signal, and
    wherein the second signal is derived from the third signal.

10. The measuring method according to claim 9,
    wherein fading and/or noise and/or a multipath propagation is added to the second signal,
    wherein the modified second signal is transmitted as a fourth signal, and
    wherein the fourth signal is derived from the second signal.

11. The measuring instrument according to claim 9,
    wherein the first signal comprises largely payload data, and
    wherein no control information is transmitted via the relay station.

* * * * *

UNITED STATES PATENT AND TRADEMARK OFFICE
CERTIFICATE OF CORRECTION

PATENT NO. : 9,241,278 B2  
APPLICATION NO. : 13/505848  
DATED : January 19, 2016  
INVENTOR(S) : Meik Kottkamp et al.

Page 1 of 1

It is certified that error appears in the above-identified patent and that said Letters Patent is hereby corrected as shown below:

On the title page, item 73, the Assignee's information which reads:

"RHODE & SCHWARZ GMBH & CO. KG, Munich (DE)" should read:

"ROHDE & SCHWARZ GMBH & CO. KG, Munich (DE)"

Signed and Sealed this
Twenty-fourth Day of May, 2016

Michelle K. Lee
*Director of the United States Patent and Trademark Office*